United States Patent
Rogers Martijena et al.

(10) Patent No.: US 8,256,633 B2
(45) Date of Patent: Sep. 4, 2012

(54) MULTIPURPOSE PLASTIC BOTTLE MADE IN ONE PIECE

(76) Inventors: Alan Michael Rogers Martijena, Madrid (ES); Alan Charles Rogers, Madrid (ES)

(*) Notice: Subject to any disclaimer, the term of this patent is extended or adjusted under 35 U.S.C. 154(b) by 379 days.

(21) Appl. No.: 12/522,930

(22) PCT Filed: Nov. 8, 2007

(86) PCT No.: PCT/ES2007/070181
§ 371 (c)(1),
(2), (4) Date: Jul. 13, 2009

(87) PCT Pub. No.: WO2008/092973
PCT Pub. Date: Aug. 7, 2008

(65) Prior Publication Data
US 2010/0044339 A1    Feb. 25, 2010

(30) Foreign Application Priority Data
Jan. 29, 2007  (ES) .................................. 200700228

(51) Int. Cl.
*B65D 90/02*   (2006.01)

(52) U.S. Cl. ...... 215/379; 215/382; 220/4.16; 220/4.01; 220/4.13; 220/4.28; 220/8

(58) Field of Classification Search .................. 215/371, 215/379, 382; 220/4.01, 8, 4.03, 4.13, 4.16, 220/4.28
See application file for complete search history.

(56) References Cited

U.S. PATENT DOCUMENTS

| 3,100,576 | A |   | 8/1963 | Frank |        |
|-----------|---|---|--------|-------|--------|
| 3,195,752 | A |   | 7/1965 | Cox   |        |
| 3,198,375 | A | * | 8/1965 | Hunter | 222/566 |
| 3,263,847 | A | * | 8/1966 | Amann | 215/382 |
| 3,385,461 | A | * | 5/1968 | Mallin | 215/382 |
| 4,931,329 | A | * | 6/1990 | Sun | 428/36.92 |
| D348,007  | S | * | 6/1994 | Feen | D9/556 |
| D412,838  | S | * | 8/1999 | Pljakic | D9/652 |
| 6,230,912 | B1 | * | 5/2001 | Rashid | 215/383 |

FOREIGN PATENT DOCUMENTS
FR   1436030   6/1966

* cited by examiner

*Primary Examiner* — Tri Mai
(74) *Attorney, Agent, or Firm* — Allen, Dyer, Doppelt, Milbrath & Gilchrist, P.A.

(57) ABSTRACT

The present invention refers to a multipurpose plastic bottle made in one reusable piece which is provided with the means for conversion to objects which may be kept by the user. It comprises an upper belt and a lower belt formed by pairs of circular rings connected round the whole profile of the bottle with the connection of both pairs of rings defined by a cutting guide for separating the bottle in an upper section, a mid section and a lower section. The multipurpose plastic bottle which is the object of the invention belongs to the technical sector of plastics, specifically to the plastic industry relating to manufacture of bottles designed to hold liquids for mass distribution and consumption. The products to be bottled are soft drinks, sodas, drinking water, cooking oils and domestic cleaning products.

5 Claims, 4 Drawing Sheets

MULTIPURPOSE PLASTIC BOTTLE MADE IN ONE PIECE

RELATED APPLICATIONS

This application is a 35 USC 371 national stage application of international application PCT/ES2007/070181 filed Nov. 8, 2007, which claims priority from Spain patent application ES 200700228 filed Jan. 29, 2007.

OBJECT OF THE INVENTION

The present invention refers to a multipurpose plastic bottle made in one reusable piece which, when empty, is provided with the means for conversion to a useful object to be kept by the user.

The bottle is designed to enable a considerable proportion of its plastic structure to be immediately recycled for further use once the content of the bottle has been consumed, thus automatically ensuring a considerable positive impact on the environment. This means that large quantities of plastic bottles would be partially recycled daily by the end user in their own home. This domestic recycling would drastically reduce the volume of plastic waste generated by the effects of normal human activity.

The plastic bottle which is the object of the invention comprises an upper belt and a lower belt formed by pairs of connected circular rings round the whole profile of the bottle with the connection of both pairs of rings defined by a cutting guide for separating the bottle in an upper section and mid section and a lower section.

The multipurpose plastic bottle which is the object of the invention belongs to the technical sector of plastics, specifically to the plastic industry relating to manufacture of bottles designed to hold liquids for mass distribution and consumption. The products to be bottled are soft drinks, sodas, drinking water, cooking oils and domestic cleaning products.

BACKGROUND TO THE INVENTION

In our present society liquids are bottled distributed, sold and consumed daily in millions of plastic bottles in most countries of the world. These liquids, normally distributed and sold in massive quantities, may be divided into two categories: drinkable and non-drinkable. Drinkable liquids usually consist of soft drinks, sodas, beer, drinking water, juices and domestic cooking oils. Non-drinkable liquids are mainly cleaning liquids for domestic use, washing additives and liquid soaps.

Currently, the great majority of these liquids are packaged and sold in conventional plastic bottles formed by a single complete plastic unit.

In the plastics industry, complete plastic bottles are manufactured in two ways: by the PET method (polyethylene terephthalate) and plastic injection method (HDPE).

At the present time both the PET and plastic injection methods are used to manufacture plastic bottles complete in one single part.

Technical Problem Proposed

Conventional plastic bottles are designed to be thrown away completely once their content has been consumed, and this concept of using and discarding wastes a considerable amount of energy and materials, thus generating a negative impact on the sustainability of human activity and the environment.

Some printed labels on plastic bottles recommend throwing away the bottle once its content has been consumed and they also advise against filling the bottle even if it has contained drinking water. Discarded plastic bottles represent a high percentage of plastic waste collected daily by the health authorities. Conventional plastic bottles generate large a volume and weight of solid waste.

Discarded plastic bottles normally have a screw closure in its position. A conventional plastic bottle with its screw closure in position is a hermetic container and full of air, and therefore it is very difficult to compact when handling solid waste, thus generating an additional volume problem. This means that large amounts of discarded plastic bottles represent a daily problem of plastic volume for the health authorities in handling and managing solid waste. If we add to the previous negative consequences the incorrect manner of discarding them in containers which have not been specifically designed for that purpose, the problem is aggravated.

Municipal governments and authorities annually spend large amounts of material and economic resources on promoting recycling in general. In the specific case of conventional plastic bottles, this promotion is mainly aimed at educating and creating awareness in the population of how to correctly dispose of complete plastic bottles and the appropriate place for discarding them.

A conventional plastic bottle is not designed for any future use once its content has been consumed. This means that when it is empty the end user has no alternative but to throw away the plastic bottle.

The plastic bottle which is the object of this invention has been designed to provide a solution to the above mentioned problems. The main objective of this invention is that of converting the empty plastic bottle into two useful objects, which are practical and attractive to the consumer, such as container and lid.

It has been proven that the best way in which to recycle is for the consumer to immediately reuse an original container without any further additional process required to treat or recycle the waste product.

Instant recycling directly in the home, of a high proportion of the plastic content of a plastic bottle would generate many benefits for the sustainability of society and the environment.

DESCRIPTION OF THE INVENTION

The present invention refers to a type of plastic bottle designed to convert the bottle used to hold liquids into two useful objects when the bottle contents have been consumed. The plastic bottle which is the object of this invention is designed to hold all types of drinkable and non-drinkable liquids except for those which are extremely toxic.

The structure of the plastic bottle which is the object of the invention comprises an upper belt and a lower belt formed by pairs of circular rings connected round the whole profile of the bottle with the connection of both pairs of rings defined by a cutting guide for separating the bottle in an upper section and mid section and a lower section. The vertical section of the circular rings is therefore, a section of circumference which will be defined on the basis of the profile of the plastic bottle.

The structure of the plastic bottle comprises three sections joined by two pairs of rings forming a single part. These two pairs of rings divide the bottle in the following manner:

Upper section, formed by: the upper part of the bottle termed lid.

Mid section, formed by: the mid part of the bottle termed skirt.

Lower section, formed by: the lower part of the bottle termed container.

The two sections, upper and lower section are designed to have printed material placed on their external surface. This printed matter, normally in colour, may consist of decorative, educational, informative, advertising or promotional motives.

When the liquid content in the bottle has been consumed, the three sections of the bottle are designed to be easily separated by mechanical cutting of the structure into two parts. The two mechanical cuts would be made by the user with a sharp object or knife using the connection of the two rings as a cutting guide. Having made these cuts, the two or three sections would be separated.

The lower section of the bottle would become a container. This container may be designed in the form and appearance of a traditional glass, or it may have the form and appearance of a container. Other forms and appearances may be used for the lower section termed container.

The container, as it is plastic, is designed to be washable and usable for a long period of time. The size and form of the container shall depend on the design of the bottle and the amount of liquid to be stored in the bottle.

As the container has printed material on its external surface which makes it an attractive, useful and practical object, the consumer would be encouraged to conserve it for future use instead of throwing it away.

The upper section, lid, is a complement to the container used to cover and protect its content. As it is plastic, the lid is designed to be washable and usable for a long period of time.

As the lid has printed material on its external surface which makes it an attractive, useful and practical object, the consumer would be encouraged to conserve it for future use instead of throwing it away.

By converting the plastic bottle into two useful objects, the consumer would be encouraged to conserve these objects instead of throwing them away, in this way extending the useful life of most of the plastic bottle and in doing so extending its life cycle.

The only part of the plastic bottle to be discarded is the mid part of the bottle termed the skirt. The skirt represents a reduced percentage of the total plastic structure of the bottle and has the tremendous advantage of being hollow and open at both ends, thus it will be easy to compact in the waste handling process.

The product labels and bar codes are printed on or affixed to the skirt part. This means that 100% of the external surface of the container and the lid may be used for the printing of decorative, educational, informative, advertising and promotional motives.

INDUSTRIAL APPLICATION

According to the foregoing, the plastic industry would not have to alter in any way its present industrial production process for conventional plastic bottles in order to produce the bottle which is the object of this invention.

If the multipurpose plastic bottle were manufactured using the PET method, it would only require the design of a mould which would define the outline of the bottle.

Following the manufacturing process the bottle is transferred to the xerographic colour printing process

ADVANTAGES

The plastic bottle which is the object of the invention has the following advantages:

1.—The plastic multipurpose bottle does not change the concept and use of the plastic bottle but rather adds a considerable environmental and social advantage to it.

2.—The plastic multipurpose bottle is designed to be manufactured using existing mass production methods.

3.—The plastic multipurpose bottle may be used in a conventional manner to package, conserve, transport, handle, sell and consume liquids.

4.—The external surface of the container and the lid may be used for the printing in all colours of decorative, educational, informative, advertising and promotional motives.

5.—The consumer would receive along with its liquid content a practical container and lid with each bottle.

6.—The multiple forms of the container can be adapted to various uses given to it by the end user.

7.—If the lid is designed to fit loosely over the container with its screw closure in place, it protects the content of the container from dust, insects or any other environmental contamination.

8.—If the lid is designed to fit firmly on the container, it becomes a useful container for conserving solids or liquids.

9.—With the bottle in two parts, the content kept in the container is easily accessible by unscrewing the screw closure.

10. When the multipurpose bottle is empty, it may be filled and reused as a conventional bottle.

11.—The practical and useful container and lid will encourage the end user to keep them, thus achieving instant recycling of the plastic content of the bottle and considerably reducing the final amount of plastic waste collected and treated by the health authorities.

12.—The only part of the bottle to be discarded, that is the skirt, is hollow and open at both ends, this means that it is easily compacted in the waste handling process.

13.—With this instant domestic recycling of the plastic content of the bottle, the public obtains large quantities of plastic glasses resulting in a reduction in the demand for traditional glasses, generating substantial savings in the energy and raw materials currently used in the manufacture of these articles.

DESCRIPTION OF THE DRAWINGS

The present descriptive report is complemented by a set of plans illustrating a preferred embodiment of the invention, but one which is in no way restrictive.

PREFERRED EMBODIMENT OF THE INVENTION

The plastic multipurpose bottle has several specially designed characteristics. Below a more detailed description is provided referring to the figures and the numbers.

Figure 1:
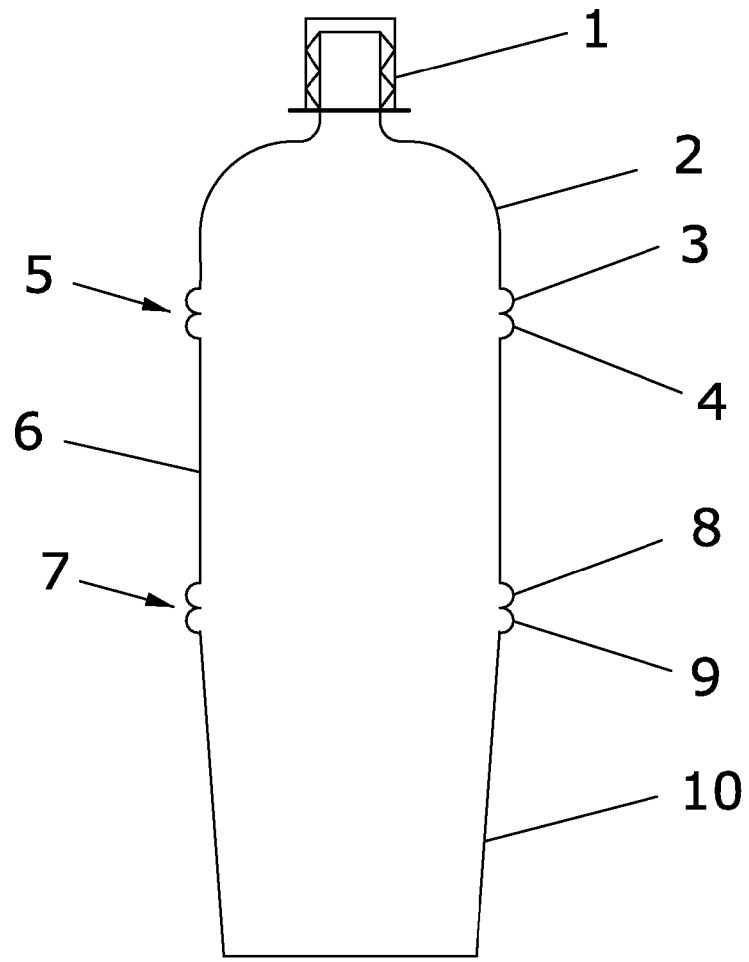
FIG. 1 shows a complete plastic bottle. It is a plastic bottle made in one piece.

FIG. 1 shows the complete plastic bottle. It is also possible to observe an upper belt (5) and a lower belt (7). These two belts (5,7) divide the bottle into three sections. The figure also shows a screw closure (1) a lid (2), an upper ring (3) of the upper belt (5), a lower ring (4) of the upper belt (5), a skirt (6), an upper ring (8) of the lower belt (7), a lower ring (9) of the lower belt (7) and a container (10).

Figure 3:
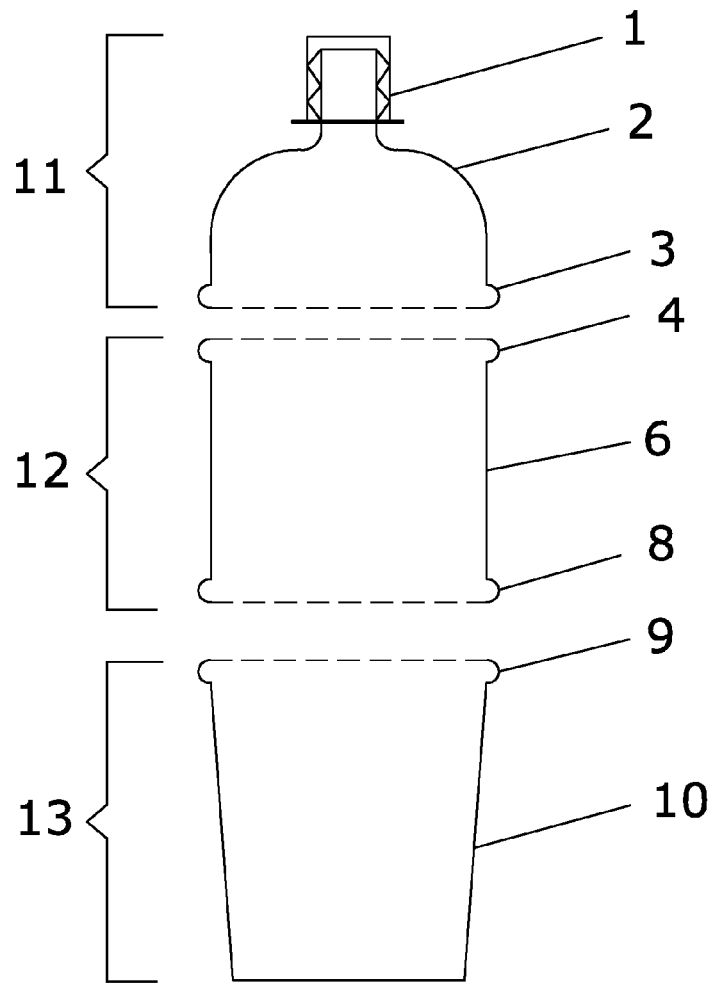
FIG. 3 shows a bottle cut and separated into its three sections.

FIG. 3 shows the bottle separated in its three sections. The upper part termed the upper section (11), the mid part termed mid section (12) and the lower part termed lower section (13). The lower part represents a container (10).

When the liquid content of the bottle has been consumed, the complete bottle is designed to be easily separated into three sections by means of mechanical cuts. By making these cuts in the belts (5, 7) the upper section (11) is separated from the mid section (12) and the mid section (12) from the lower section (13).

Figure 2:
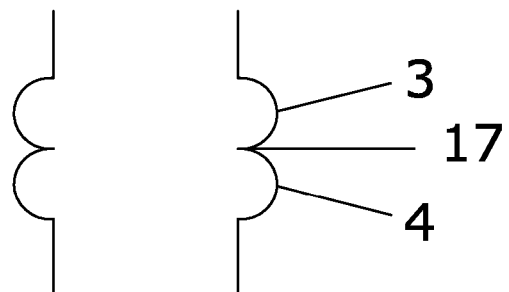
FIG. 2 shows a belt in which two joined rings may be seen defining a cutting guide.

The upper section (11), lid (2), see FIG. 3, is designed to be separated from the mid section (12), skirt (6), see FIG. 3, by means of cutting with a knife or any other sharp object round the upper belt (5) with the aid of a cutting guide (17) shown in FIG. 2. The lower section (13), container (10), see FIG. 3, is designed to be separated from the mid section (12), skirt (6), see FIG. 3, by cutting with a knife or any other sharp object round the lower belt (7) with the help of a cutting guide (17), see FIG. 2.

A belt (5, 7) see FIG. 2, comprises two circular rings (3, 4, 8, 9) connected around its entire profile. The cutting process is designed to be made in the centre connection of these two rings termed cutting guide (17), see FIG. 2.

Figure 4:
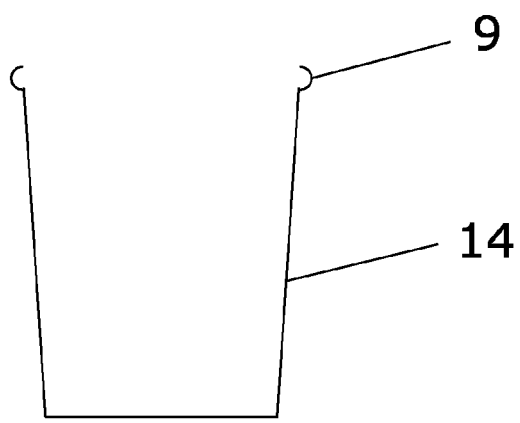
FIG. 4 shows the lower section of the bottle. This lower section termed container has the form of a traditional glass.
Figure 6:
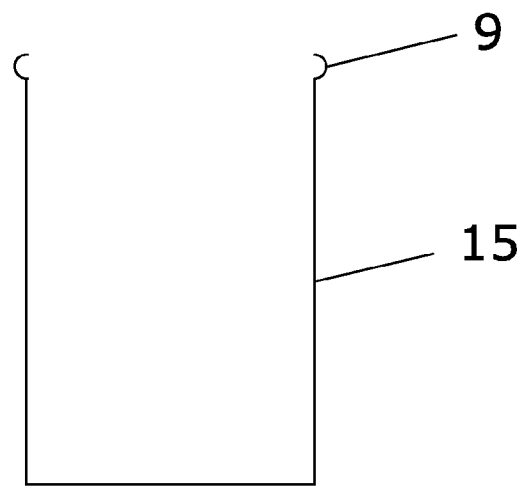
FIG. 6 shows the lower section of the bottle. This lower section termed container has the form of a receptacle.

When the three sections are separated, the lower section (13) becomes a container (10). The container (10) may be manufactured in the form and appearance of a traditional glass (14), see FIG. 4, or it may have the form of a container (15), see FIG. 6. Other forms and aspects may be used for the lower section termed container (10).

The container (10) is designed to have printed material on its external surface.

Figure 8:
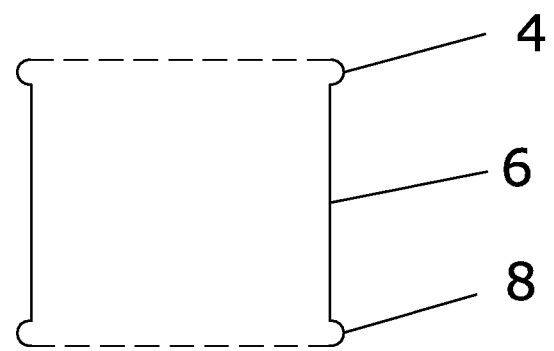
FIG. 8 shows the skirt, when it has been separated from the lid of the container, which is hollow and open at both ends.

When the mid section (12), termed skirt (6), has been separated from the container (10) and from the lid (2), see FIG. 8, it presents a hollow object open at both ends, which is very flexible and light, this is the only part of the bottle designed to be discarded. As the skirt (6) is flexible it is easy to compact and compress and therefore the volume of plastic waste is small.

The upper section (11) of the bottle has a lid incorporated in its design (2). The conventional lid closure of the bottle may also be used and is not discarded. In order to better comprehend this invention, this lid closure is a screw closure (1), see FIG. 1. It is understood for the purpose of the invention that any type of bottle lid (1) may be used.

The lid (2) is designed to cover and protect the content of the container (10).

Figure 5:
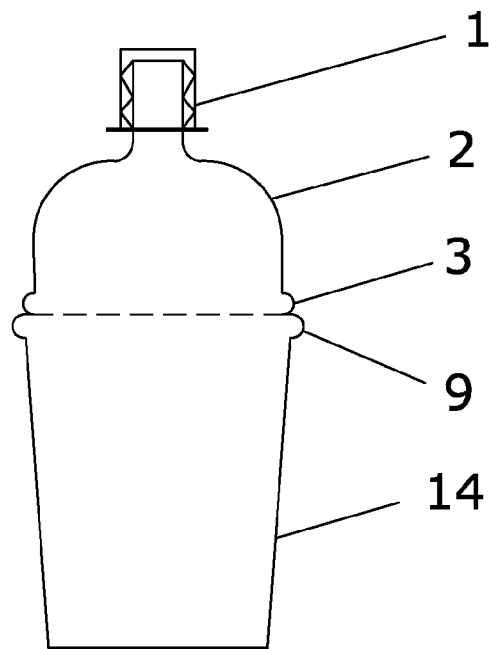
FIG. 5 shows the container in the form of a traditional glass with the lid in place. The lid is designed to fit comfortably on the glass. This figure shows the result of separating the lid and the container incorporated in the bottle structure, both converted into useful objects.

The lid (2) will be fitted comfortably on and round the upper edge of the container (10) see FIG. 5. This type of lid (2) with its screw closure (1) when in place would protect the contents of the container (10) from insects, dust and any other environmental contaminant. The lid (2) would be easily separated from the container in order to drink from it or fill it or for other uses.

The screw closure (1) may be removed if the content of the container is to be consumed with a straw, facilitating this action.

Figure 7:
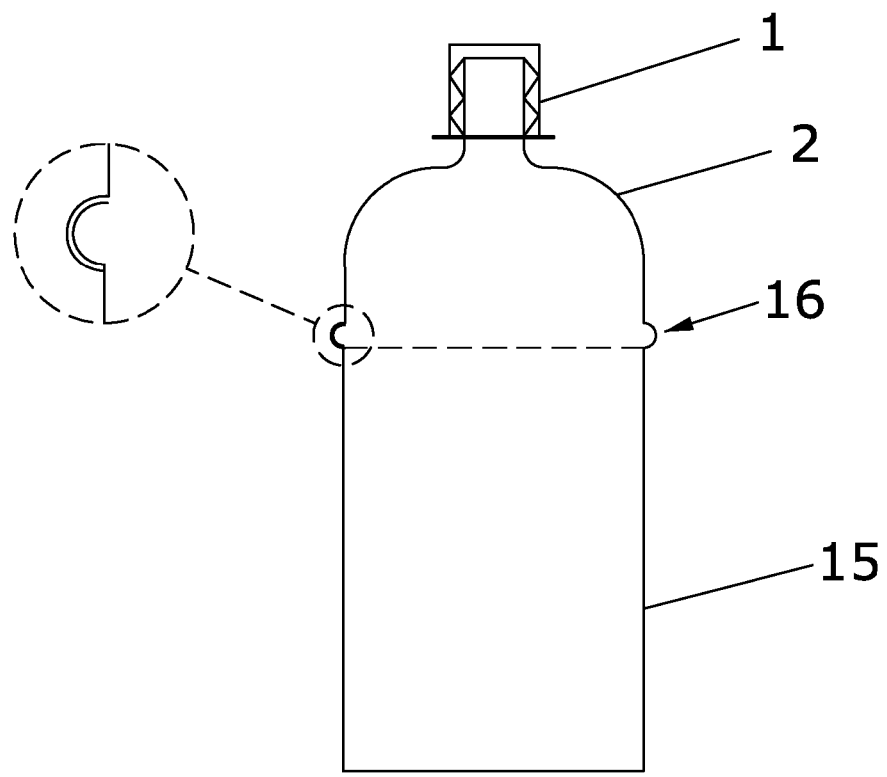
FIG. 7 shows the container in the form of a receptacle with the lid in place. The lid is designed to fit firmly on the lower ring of the lower belt. This figure shows the result of separating the lid and the container incorporated in the structure of the bottle, both converted into useful objects.

If the lid (2) is pressed downwards on the container (10) the upper ring (3) of the upper belt (5) see FIG. 3, will fit firmly on the lower ring (9) of the lower belt (7) see FIG. 3, forming a connection between the container and the lid (16) see FIG. 7, The firmly fitted lid (2) would be easily extracted by the user. This type of lid (2) would convert the container (10) into a practical and useful container (15) for conserving solids and liquids.

The screw closure (1) see FIG. 7, may be withdrawn in order to facilitate access and service of the container content (10).

When the lid (2) and the container (10) incorporated in the structure of the bottle are separated, both become useful supplementary objects as may be seen in FIGS. 5 and 7. The container (10) and the lid (2) convert the empty bottle into an extremely useful utensil for the consumer.

The invention claimed is:

1. A multipurpose bottle made in one piece, comprising: an upper belt (5) and a lower belt (7) wherein each of the belts (5, 7) are formed by two pairs of outwardly protruding circular rings (3,4) and (8,9) respectively, connected around a profile of a bottle, with cutting guides defining a connection of every pair of rings (3,4) and (8,9) for separating the bottle into an upper section (11), a mid section (12) and a lower section (13),
wherein the upper section (11) comprises a lid (2) and an upper ring (3) of an upper belt (5), while the lower section (13) comprises a container (10) and the lower ring (9) of the lower belt (7) characterized in that the lower ring (3) of the upper section (11) and the upper ring (9) of the container (10) are configured to be joinable and to be coupled, as the upper ring (3) of the upper belt (5) has a different diameter than that of the lower ring (9) of the lower belt (7), forming a bottle made up of both elements.

2. The multipurpose bottle made in one piece, according to claim 1, characterised in that the mid section (12) comprises a skirt (6) and above the lower ring (4) of the upper belt (5) and below the upper ring (8) of the lower belt (7).

3. The multipurpose bottle made in one piece according to claim 1, characterised in that the mid section (12) is discarded.

4. The multipurpose bottle made in one piece according to claim 1, characterised in that the container is a storage receptacle (14, 15).

5. The multipurpose bottle made in one piece according to claim 1, characterised in that the rings (3, 9) are configured to be tightly engaged with each other.

* * * * *